No. 771,475. Patented October 4, 1904.

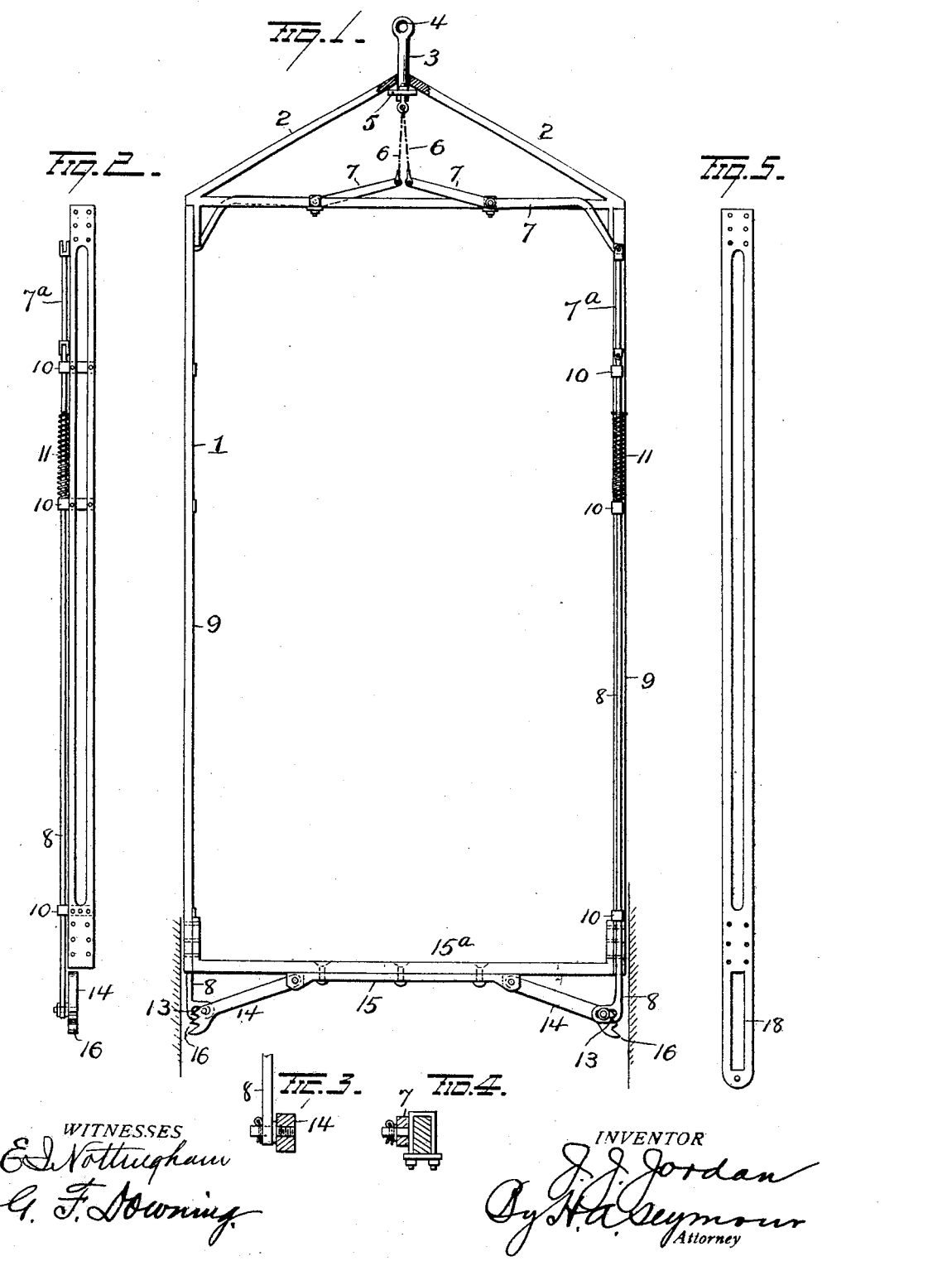

UNITED STATES PATENT OFFICE.

JOHN J. JORDAN, OF TANOPAH, NEVADA.

SAFETY DEVICE FOR ELEVATORS.

SPECIFICATION forming part of Letters Patent No. 771,475, dated October 4, 1904.

Application filed April 18, 1904. Serial No. 203,728. (No model.)

*To all whom it may concern:*

Be it known that I, JOHN J. JORDAN, a resident of Tanopah, in the county of Nye and State of Nevada, have invented certain new and useful Improvements in Safety Devices for Elevators; and I do hereby declare the following to be a full, clear, and exact description of the invention, such as will enable others skilled in the art to which it appertains to make and use the same.

My invention relates to improved safety devices for elevators, the object of the invention being to provide improvements of this character located at the bottom of the elevator-cage and controlled by the supporting rope or cable, so that when the latter breaks the safety devices will immediately become operative to stop and hold the elevator.

With this object in view the invention consists in certain novel features of construction and combinations and arrangements of parts, as will be more fully hereinafter described, and pointed out in the claims.

In the accompanying drawings, Figure 1 is a view in cross-section, illustrating my improvements. Fig. 2 is a side view of a side bar. Figs. 3 and 4 are views of details of construction, and Fig. 5 is a modified form of side bar.

1 represents an elevator-cage having inclined supporting-rods 2 at its top converging to a central opening, in which a pin 3 is movable. This pin 3 has an eye 4 at its upper end, to which the hoisting-cable is secured, and a stop or shoulder plate 5 is provided on the pin near its lower end to engage the rods 2 and support the elevator-cage. A chain 6 is secured to the lower end of pin 3 and connected with the inner ends of levers 7, projecting in opposite directions and pivoted between their ends, as shown. The outer ends of these levers 7 are pivotally connected to the bifurcated ends of links 7ª, and the ends of said links are pivotally attached to vertical rods 8. These rods 8 move vertically in guides 10 at the side edges of side bars 9, forming a portion of the cage, and coiled springs 11, located on the rods, are secured at one end thereto and bear at their other ends against guides 10 to always exert an upward pressure on the rods.

The lower ends of rods 8 have lateral extensions made with elongated slots 13 to receive pins for connecting them with safety-dogs 14. These dogs are pivoted at their inner ends to the ends of a bar 15, which latter is secured to a cross-bar 15ª, having bent-up ends fixed to the side bars 9. The dogs 14 are provided at their outer ends with teeth 16, located eccentrically to the pivot-point of the dogs, so that the higher up the dogs move with relation to the bottom of the cage the greater will be their outward pressure on the side bars of the elevator-shaft, which ordinarily are made of wood, and the teeth will be driven thereinto and effectually hold the cage.

The operation of my improvements is as follows: In normal position the dogs 14 are held down in their lowest position, as the weight of the cage will cause the supporting-rods 2 to move down on pin 3 and rest on the shoulder 5, thus drawing up the inner ends of levers 7, depressing their outer ends, and forcing downward rods 8 and the dogs 14, with which they are connected. Should the hoisting-cable break, springs 11 will immediately throw rods 8 upward, as all downward pressure on the rods will then be removed, and the dogs will be raised far enough upward to project their teeth outward against the side bars of the elevator-shaft, and the weight of the cage will drive the teeth firmly into the bars of the shaft and securely hold the cage from falling.

While I have described the dogs as being located at the bottom of the cage, where a double-decker or freight cage is provided below the main cage 1, the side bars 17 of the elevator-cage will be made with slotted extensions 18 to permit free movement outward of the dogs located at the bottom of the upper or main cage.

A great many changes might be made in the general form and arrangment of the parts described without departing from my invention, and hence I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. The combination with an elevator-shaft, of dogs toothed at their outer ends and pivotally connected at their inner ends with the bottom of the cage in such proximity to the sides of the cage that when moved upwardly, the toothed ends of said dogs will project beyond the sides of the cage and engage the walls of the elevator-shaft, levers pivotally supported between their ends in the upper part of the cage, a pin movable through the top of the cage and connected with the inner ends of said levers, connections between the outer ends of said levers and the dogs, and springs on said connections tending to raise them.

2. The combination with an elevator-cage, of dogs pivotally connected to the bottom thereof and adapted to engage the walls of the elevator-shaft, vertically-movable rods having slotted lateral extensions at their lower ends connected with said dogs, guides for said rods, a spring on each rod tending to raise the same, levers pivoted between their ends in the upper part of the cage, means for connecting the outer ends of said levers with said rods, a pin movable through the top of the cage and means connecting said pin with the inner ends of said levers.

3. The combination with an elevator-cage having inclined supporting-rods at its top converging to a central opening, of a pin in said opening adapted to be secured to a hoisting-cable, a stop or shoulder on the lower end of the pin to limit its vertical movement in the opening and support the weight of the cage thereon, levers pivoted between their ends to the cage, a flexible connecting device between the inner ends of said levers and the pin to normally hold the outer ends of said levers depressed, pivoted dogs at the bottom of the cage mounted electrically, rods connecting dogs and levers to hold by the weight of the cage, the dogs out of contact with the elevator-shaft, and springs exerting upward spring-pressure on said rods.

4. In an elevator-cage, the combination with side bars, of a cross-bar at the bottom of the cage secured to the side bars, a short bar secured to the bottom of the cross-bar, safety-dogs hinged at the ends of the shorter bar and provided at their outer ends with teeth to engage the walls of the elevator-shaft, means for normally holding said dogs depressed, and means to raise said dogs and permit them to engage the wall of the elevator-shaft and stop and hold the cage when the cable breaks.

In testimony whereof I have signed this specification in the presence of two subscribing witnesses.

JOHN J. JORDAN.

Witnesses:
RALPH WARDLE,
R. G. RALSTON.